(12) United States Patent
Johnson

(10) Patent No.: US 8,133,615 B2
(45) Date of Patent: Mar. 13, 2012

(54) ALKALINE ELECTROCHEMICAL CELL

(75) Inventor: Robert P. Johnson, Lakewood, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1212 days.

(21) Appl. No.: 11/471,691

(22) Filed: Jun. 20, 2006

(65) Prior Publication Data

US 2007/0292762 A1    Dec. 20, 2007

(51) Int. Cl.
*H01M 4/50* (2010.01)

(52) U.S. Cl. .......................... 429/224; 429/185

(58) Field of Classification Search .............. 429/224, 429/185, 206, 231.95, 218.1, 229, 232
See application file for complete search history.

(56) References Cited

U.S. PATENT DOCUMENTS

| | | | |
|---|---|---|---|
| 5,283,139 | A | 2/1994 | Newman et al. |
| 6,207,322 | B1 | 3/2001 | Kelsey et al. |
| 6,265,105 | B1 | 7/2001 | Tokuda et al. |
| 6,368,365 | B1 | 4/2002 | Chi et al. |
| 6,936,378 | B2 | 8/2005 | Randell |
| 2004/0197655 | A1* | 10/2004 | Randell ................ 429/224 |
| 2005/0106461 | A1 | 5/2005 | Moore et al. |
| 2006/0003225 | A1 | 1/2006 | Okubo et al. |
| 2006/0068288 | A1 | 3/2006 | Johnson |

FOREIGN PATENT DOCUMENTS

| | | |
|---|---|---|
| GB | 2377077 | 12/2002 |
| WO | WO 0048260 | 8/2000 |
| WO | 02059991 A | 8/2002 |
| WO | WO 02101858 | 12/2002 |
| WO | WO 03043103 | 5/2003 |
| WO | WO 2005091401 | 9/2005 |

OTHER PUBLICATIONS

Patent Cooperation Treaty (PCT), International Search Report and Written Opinion for Application PCT/US2007/014027 filed Jun. 15, 2007, mailed Nov. 13, 2007, 8 pgs., European Patent Office, Netherlands.

* cited by examiner

*Primary Examiner* — Cynthia H. Kell
*Assistant Examiner* — Monique Wills
(74) *Attorney, Agent, or Firm* — Michael C. Pophal

(57) ABSTRACT

An alkaline electrochemical cell is provided which efficiently utilizes active materials within the cell to achieve enhanced cost efficiency. The electrochemical cell includes a container defining a sealed volume and an anode and cathode disposed in the sealed volume of the container. The cathode includes manganese dioxide and the anode includes zinc. A ratio of zinc weight to anode volume is less than 1.8. An alkaline electrolyte is disposed in the container in contact with the anode and cathode, and water is disposed within the container. A weight ratio of water to manganese dioxide is greater than 0.28, and a weight ratio of water to zinc is greater than 0.65.

42 Claims, 4 Drawing Sheets

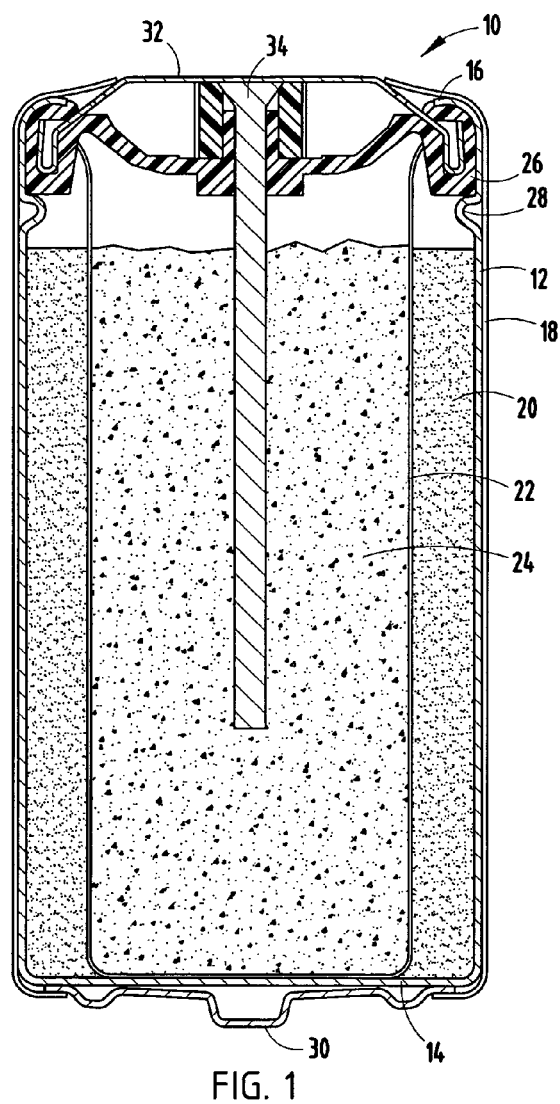
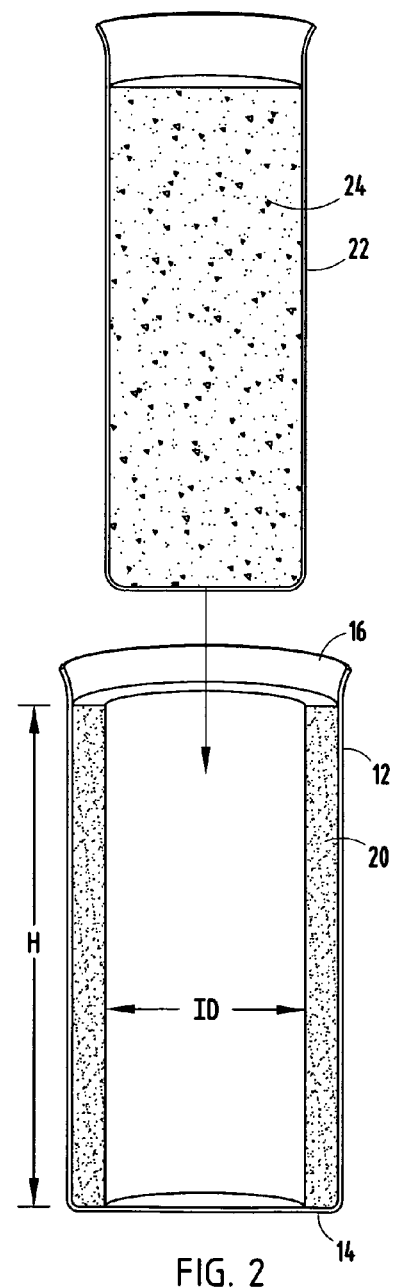
FIG. 1
FIG. 2

LR6 Cell Component Quantities and Ratios
(Based on Manufacturing Data)

| CID | Cell per Invention | Commercially Available Cell A | Commercially Available Cell B | Commercially Available Cell C | Commercially Available Cell D |
|---|---|---|---|---|---|
| Cathode parameters | | | | | |
| EMD weight (g) | 8.08 | 9.25 | 8.83 | 9.38 | 8.83 |
| Impact molding ram diameter (in) | 0.385 | 0.360 | 0.370 | 0.360 | 0.370 |
| Cathode ID (inches) | 0.371 | 0.346 | 0.356 | 0.346 | 0.356 |
| Anode | | | | | |
| Zinc weight (g) | 3.66 | 4.14 | 4.13 | 4.14 | 3.97 |
| Zn concentration (wt%) | 60.88 | 69.64 | 68.30 | 69.64 | 68.30 |
| KOH solution concentration (wt%) | 36.00 | 40.00 | 28.82 | 40.00 | 28.82 |
| ZnO concentration in electrolyte solution (%) | 1 | 3 | 1 | 3 | 1 |
| Theoretical anode density (%) | 98 | 98 | 98 | 98 | 98 |
| Zinc powder (ref) | NGBIA115 | BIA | NGBIA115 | BIA | NGBIA115 |
| Anode volume (cm³) | 2.30 | 1.90 | 2.10 | 1.90 | 2.02 |
| Anode Calculations | | | | | |
| In Cell Volume (%) | | | | | |
| Zinc (real vol %) | 22.80 | 31.162 | 28.204 | 31.162 | 28.204 |
| Anode volume (cc) | 2.30 | 1.90 | 2.09 | 1.90 | 2.01 |
| Full Cell | | | | | |
| Total Water weight (g) | 2.63 | 2.31 | 2.52 | 2.24 | 2.44 |
| Total KOH weight (g) | 1.45 | 1.41 | 1.23 | 1.36 | 1.20 |
| A/C ratio (1.00 e-) | 1.30 | 1.29 | 1.35 | 1.27 | 1.30 |
| Moles water/moles $MnO_2$ | 1.57 | 1.21 | 1.38 | 1.15 | 1.34 |
| Water/Zn (weight ratio) | 0.72 | 0.56 | 0.61 | 0.54 | 0.62 |
| KOH/Zn (weight ratio) | 0.40 | 0.34 | 0.30 | 0.33 | 0.30 |
| Water/EMD (weight ratio) | 0.33 | 0.25 | 0.29 | 0.24 | 0.28 |
| Cathode Efficiency | | | | | |
| 43 ohm for 4 hours per day to 0.9V (1.33e- (Amp-hrs) basis) | 76.2% | 73.8% | 75.5% | 74.1% | 75.3% |
| Zn wt per volume of anode (Zn g/anode cm³) | 1.59 | 2.18 | 1.97 | 2.18 | 1.97 |

FIG. 3

LR6 Cell Component Quantities and Ratios
(Based on Analytical Tear Down Measurement Data)

| In Cell wt and Volume | Cell per Invention | Commercially Available Cell E | Commercially Available Cell F | Commercially Available Cell G | Commercially Available Cell H |
|---|---|---|---|---|---|
| EMD wt (g) | 7.95 g | 9.91 | 9.90 | 9.37 | 10.30 |
| Zn wt (g) | 3.58 g | 4.40 | 4.21 | 4.11 | 4.11 |
| Total KOH wt (g) | 1.42 g | 1.32 | 1.34 | 1.31 | 1.17 |
| Total Water wt (g) | 2.51 g | 2.46 | 2.57 | 2.19 | 2.53 |
| Internal Volume (cc) | 6.01 | 6.13 | 6.13 | 6.34 | 6.34 |

Calculated Ratios

| Zn : EMD wt | 0.45 | 0.44 | 0.43 | 0.44 | 0.40 |
| KOH : EMD wt | 0.18 | 0.13 | 0.14 | 0.14 | 0.11 |
| Water : EMD wt | 0.32 | 0.25 | 0.26 | 0.23 | 0.25 |
| KOH : Zn wt | 0.40 | 0.30 | 0.32 | 0.32 | 0.28 |
| Water : Zn wt | 0.70 | 0.56 | 0.61 | 0.53 | 0.62 |
| KOH : Water wt | 0.57 | 0.54 | 0.52 | 0.60 | 0.46 |

FIG. 4

Estimated LR6 Cell Component Quantities and Ratios
(Based on Scaled Analytical Tear Down Measurement Data)

| In Cell wt and Volume | Cell per Invention | Commercially Available Cell E | Commercially Available Cell F | Commercially Available Cell G | Commercially Available Cell H |
|---|---|---|---|---|---|
| EMD wt (g) | 9.25 | 11.53 | 11.52 | 10.91 | 11.99 |
| Zn wt (g) | 4.14 | 5.09 | 4.87 | 4.76 | 4.76 |
| Total KOH wt (g) | 1.41 | 1.31 | 1.33 | 1.30 | 1.16 |
| Total Water wt (g) | 2.31 | 2.27 | 2.37 | 2.02 | 2.33 |
| Internal Volume (cc) | 6.01 | 6.13 | 6.13 | 6.34 | 6.34 |

Calculated Ratios

| | | | | | |
|---|---|---|---|---|---|
| Zn : EMD wt | 0.45 | 0.45 | 0.43 | 0.44 | 0.40 |
| KOH : EMD wt | 0.18 | 0.13 | 0.14 | 0.14 | 0.11 |
| Water : EMD wt | 0.33 | 0.26 | 0.27 | 0.24 | 0.25 |
| KOH : Zn wt | 0.40 | 0.30 | 0.32 | 0.32 | 0.28 |
| Water : Zn wt | 0.72 | 0.57 | 0.63 | 0.55 | 0.63 |
| KOH : Water wt | 0.55 | 0.52 | 0.51 | 0.58 | 0.45 |

FIG. 5

ALKALINE ELECTROCHEMICAL CELL

BACKGROUND OF THE INVENTION

The present invention generally relates to electrochemical cells (batteries), and more particularly relates to a cost-efficient alkaline electrochemical cell that efficiently utilizes electrochemically active materials.

Alkaline electrochemical cells are commercially available in standard cell sizes. Examples of cylindrical alkaline cells are commonly known as LR6 (AA), LR03 (AAA), LR14 (C) and LR20 (D). Battery manufacturers have made great strides to improve the capacity of the cells to improve the length of time that electrical devices can be powered, while at the same time constantly striving to reduce the cost of the battery. Alkaline electrochemical cells employ electrochemically active materials within the positive electrode (cathode) and the negative electrode (anode), which generally are more expensive than other internal cell components. These electrochemically active materials include zinc employed within the anode and manganese dioxide employed within the cathode.

In order to optimize the performance of the battery cell, the quantity of zinc employed in the anode and the quantity of manganese dioxide employed in the cathode are appropriately selected. A simple reduction in the amount of active materials may reduce the cost of the battery, but will usually adversely decrease the battery's "run time," which is the length of time the battery will power a device. Contrarily, an increase in the amount of active material, such as zinc, may result in unacceptable leakage of electrolyte under certain conditions and will generally increase the cost of the battery.

What is needed is an efficient electrochemical cell that offers adequate performance at a competitive cost. In particular, it is desirable to effectively utilize the electrochemically active materials within the cell such as to advantageously achieve a more cost-efficient battery cell.

SUMMARY OF THE INVENTION

In accordance with the teachings of the present invention, an alkaline electrochemical cell is provided which efficiently utilizes active materials within the cell in a manner that realizes enhanced cost efficiency. According to one aspect of the present invention, the electrochemical cell includes a container defining a sealed volume and a cathode and anode disposed in the sealed volume of the container. The cathode includes manganese dioxide and the anode includes zinc. A ratio of zinc weight to anode volume is less than 1.80. An alkaline electrolyte is disposed within the container in contact with the anode and cathode. The cell includes water disposed within the container, wherein a weight ratio of the water to the manganese dioxide is greater than 0.28.

According to another aspect of the present invention, an electrochemical cell is provided which includes a container defining a sealed volume, a cathode disposed within the container and an anode disposed within the container. The cathode includes manganese dioxide and the anode includes zinc. A ratio of zinc weight to anode volume is less than 1.80. An alkaline electrolyte is disposed within the container in contact with the anode and cathode. The cell includes water disposed within the container, wherein a weight ratio of water to zinc is greater than 0.65.

According to a further aspect of the present invention, an electrochemical cell is provided which includes a container defining a sealed volume, a cathode disposed within the container and an anode disposed within the container. The cathode includes manganese dioxide and the anode includes zinc. A ratio of zinc weight to anode volume is less than 1.80. An alkaline electrolyte is also disposed within the container in contact with the anode and the cathode.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1 is a cross-sectional view of an alkaline electrochemical cell according to one embodiment of the present invention;

FIG. 2 is a partial exploded, cross-sectional view of the cell having an impact molded cathode;

FIG. 3 is a chart showing cell component quantities and ratios employed in an exemplary cell according to one embodiment of the present invention and in commercially available LR6 cells;

FIG. 4 is a chart showing cell component quantities and ratios measured during a tear down of the exemplary cell according to one embodiment of the present invention and commercially available LR6 cells; and FIG. 5 is a chart showing estimated component quantities and ratios scaled from the measured tear down data shown in FIG. 4 for the same exemplary cell according to one embodiment of the present invention and commercially available LR6 cells.

DETAILED DESCRIPTION OF THE PREFERRED EMBODIMENTS

Referring now to FIG. 1, an alkaline electrochemical cell 10 is shown according to one embodiment of the present invention. The alkaline electrochemical cell 10 shown in the exemplary embodiment and described herein is a cylindrical primary (non-rechargeable) battery cell of size LR6 (AA). However, it should be appreciated that the teachings of the present invention may be applicable to other alkaline electrochemical cells of other shapes and sizes, including LR03 (AAA), LR14 (C) and LR20 (D) size cylindrical battery cells, as examples. Additionally, the electrochemical cell 10 may be employed as a single cell battery or may be employed in a multiple cell battery.

The electrochemical cell 10 includes a cylindrical container in the form of a steel can 12, generally having a closed end 14, an open opposite end 16 and a cylindrical side wall extending between the opposite ends. The steel can 12 is made of a suitable electrically conductive metal that may be formed into a desired shape and is adapted to seal the internal contents within the cell 10. In the embodiment shown, the steel can 12 also functions as the cathode current collector, and therefore exhibits good electrical conductivity. In one embodiment, the steel can 12 may be plated with nickel and cobalt, such as may be achieved in an annealing process. The interior surface of the steel can 10 may be coated with a graphite, if desired. In one example of an LR6 size cell, the steel can 10 has a wall thickness of about 0.010 inch (10 mils or 0.025 cm) and the cylindrical wall has an outside diameter of about 0.548 inch (1.392 cm).

Welded onto the closed end 14 of steel can 12 is a positive contact terminal 30, which may be formed of plated steel. The contact terminal 30 has a protruding nubbin (i.e., protrusion), at its center which serves as the positive contact terminal of the cell 10. Assembled onto the opposite open end 16 of the steel can 12 is a collector and seal assembly made up of an anode current collector 34 (e.g., nail), a polymeric (e.g., nylon) seal 26 and a negative contact terminal 32. The open end 16 of can 12 is crimped onto the seal 26 which abuts bead 28 to seal closed the open end 16 of can 12. The negative contact terminal 32 forms a negative contact terminal of the cell 10. Positive and negative contact terminals 30 and 32 are made of electrically conductive metal and serve as the respective positive and negative electrical terminals. Additionally, a jacket 18 may be formed about the exterior surface of the steel can 10, and may include an adhesive layer, such as a metalized, plastic film layer.

Disposed within the sealed volume of steel can 12 is a positive electrode, referred to as the cathode 20, generally positioned adjacent the interior surface of the steel can 12. The cathode is generally cylindrical with an interior surface defining a cylindrical cavity having an inside diameter ID. A separator 22 is disposed in the cylindrical cavity and contacts the interior surface of the cathode 20. A negative electrode, referred to as the anode 24, is disposed within the cavity inside the separator 22. Additionally, an alkaline electrolyte solution, including water, is disposed within the sealed volume of the container 12 in contact with both the anode 24 and the cathode 20.

The cathode 20 includes manganese dioxide ($MnO_2$) as the electrochemically active material of the positive electrode. Cathode 20 is generally formed of a mixture of manganese dioxide, graphite, barium sulfate and aqueous alkaline electrolyte solution. According to an impact molding embodiment, the cathode 20 may be formed by disposing a quantity of the cathode mixture into the open ended container 12 and, with use of an impact molding ram, molding the mixture into a solid tubular (cylinder) configuration that defines a cavity generally concentric with the side wall of the container 12. Alternately, according to a ring molding embodiment, the cathode 20 may be formed by preforming a plurality of rings (e.g., three or four rings) from the cathode mixture and then inserting the preformed rings into the container 12 to form the tubular shaped cathode 20.

The anode 24, also referred to herein as the negative electrode, may include a homogeneous mixture of an aqueous alkaline electrolyte, a zinc powder and a gelling agent, such as cross-linked polyacrylic acid. The zinc powder is the electrochemically active material of the anode 24. The aqueous alkaline electrolyte may include an alkaline metal hydroxide, such as potassium hydroxide (KOH), sodium hydroxide or mixtures thereof. A gelling agent suitable for use in the anode 24 may include a cross-linked polyacrylic acid, such as Carbopol 940®, which is commercially available from Noveon, Inc., of Cleveland, Ohio. Examples of other gelling agents that may be suitable for use in the cell 10 may include Carboxymethylcellulose, polyacrylamide and sodium polyacrylate. The zinc powder may include pure zinc or zinc alloy. Additional optional components of the anode 24 may include gassing inhibitors, organic or inorganic anti-corrosive agents, binders or surfactants that may be added to the ingredients listed above. Examples of suitable gassing inhibitors or anti-corrosive agents include indium salts (such as indium hydroxide), perfluoroalkyl ammonium salts, alkali metal sulfides, etc. Examples of suitable surfactants include polyethylene oxide, polyethylene, alkylethers, perfluoroalkyl compounds and the like. The anode 24 may be manufactured by combining the ingredients into a ribbon blender or drum mixer and then working the anode mixture into a wet slurry.

In addition to the aqueous alkaline electrolyte absorbed by the gelling agent during the anode manufacturing process, an additional quantity of aqueous solution containing a solution of potassium hydroxide and water, also referred to herein as free electrolyte, is added to the electrochemical cell 10 during the manufacturing process. The free electrolyte may be incorporated into the cell 10 by disposing it into the cavity defined by the cathode 20 after the separator 22 is inserted and may also be injected after the anode 24 is disposed into the cell. According to one embodiment, the aqueous solution contains approximately thirty-seven percent (37%) by weight KOH, and sixty-three percent (63%) deionized water. Additional aqueous alkaline solution, including water, is thereby added to the electrochemical cell 10 and consumes some of the volume within the cell 10, thereby leaving less volume available for other components including the active electrode materials (zinc and manganese dioxide).

In the bobbin-type zinc/manganese dioxide alkaline cell 10 shown and described herein, the separator 22 may be provided as a layered ion permeable, non-woven fibrous fabric which separates the cathode 20 from the anode 24. The separator 22 maintains a physical dielectric separation of the cathode electrochemically active material (manganese dioxide) and the anode electrochemically active material (zinc) and allows for the transport of ions between the positive and negative electrode materials. Additionally, the separator 22 acts as a wicking medium for the aqueous electrolyte solution and as a collar that prevents fragmented portions of the anode 24 from contacting the top of the cathode 20. The separator 22 may include a conventional non-woven separator typically made of two or more layers of paper in the shape of a basket having a cylindrical wall and a closed bottom end. One example of a suitable separator is disclosed in WO03/043103.

One formula of the cathode 20 according to one exemplary embodiment is illustrated in Table 1 below. The quantities listed in the table are expressed in percent by weight of each component as compared to the overall weight of the cathode 20 employed in a given cell.

TABLE 1

| Cathode Formula | |
| --- | --- |
| Cathode Component | Weight Percent |
| Manganese Dioxide (EMD) | 82.06 |
| Graphite | 7.46 |
| 37 Weight Percent KOH | 8.48 |
| Barium Sulfate | 2.00 |

The manganese dioxide, graphite and barium sulfate are mixed together to form a homogenous cathode mixture. During the mixing process, the quantity of thirty-seven percent (37%) KOH solution is evenly dispersed into the mixture, thereby ensuring a uniform distribution of the solution throughout the cathode materials. The thirty-seven weight percent (37%) KOH solution is made of thirty-seven percent (37%) KOH with the remaining sixty-three weight percent (63%) being deionized water. Manganese dioxide is commercially available as natural manganese dioxide (NMD), chemical manganese dioxide (CMD) or electrolytic manganese dioxide (EMD). According to one embodiment, electrolytic manganese dioxide is employed in the cathode 20. The manganese dioxide may be mined from the ground (natural) or manufactured (synthetic), and may be expanded or non-expanded.

One formula for the anode 24 according to one exemplary embodiment is illustrated in Table 2 below. The quantities listed in this table are expressed in percent by weight of each component as compared to the overall weight of the anode 24 employed in a given cell.

TABLE 2

Anode Formula

| Anode Component | Weight Percent |
| --- | --- |
| Zinc Powder | 60.880 |
| Gelled Electrolyte | 37.902 |
| 0.1N KOH Solution | 1.218 |

The composition of the electrolyte solution (prior to gelling) employed as a component in the anode 24, according to one embodiment, is illustrated by weight percent in Table 3 below.

TABLE 3

Electrolyte Solution Composition

| Component | Weight Percent |
| --- | --- |
| 45 Percent KOH | 78.96 |
| De-ionized Water | 19.74 |
| Zinc Oxide | 1.00 |
| Sodium Silicate | 0.30 |

The process for preparing the anode 24 may include the following steps. The components of the electrolyte solution shown in Table 3 may be mixed to form a solution with the zinc oxide and sodium silicate dissolved therein. This solution is then mixed with a gelling agent to form the gelled electrolyte. The composition of the gelled electrolyte by weight percent is shown in Table 4 below.

TABLE 4

Gelled Electrolyte Composition

| Component | Weight Percent |
| --- | --- |
| Anode Electrolyte Solution | 98.46 |
| Gelling Agent (Carbopol ® 940) | 1.54 |

The gelled electrolyte may then be mixed with the zinc powder, surfactant solution and 0.1 N KOH solution according to the proportions shown in Table 2, thereby forming the anode 24 suitable for use in the electrochemical cell 10 of the present invention.

The anode 24 advantageously employs an amount of zinc powder that exhibits a reduced ratio of zinc weight (g) to anode volume ($cm^3$), as compared to conventional cells, yet maintains sufficient particle-to-particle contact between the zinc particles. The particle-to-particle contact between zinc particles in the anode 24 is sufficient in a mercury free battery, which is defined herein as containing less than fifty parts per million (50 ppm) of mercury in the anode. In one embodiment of the cell 10 of the present invention, the quantity of zinc in the anode 24 is reduced to less than twenty-six percent (26%) by volume. According to one specific embodiment, the volume percent of zinc in the anode 24 is approximately 22.8 percent. The volume percent zinc is determined by dividing the volume of zinc by the volume of the anode 24 just prior to dispensing the anode 24 into the separator 22 lined cavity. The volume percent zinc is determined before dispensing the anode 24 into the separator basket because a portion of the electrolyte incorporated in the anode 24 may migrate into the separator 22 and cathode 20 once the anode 24 is inserted into the cavity defined by the separator 22. The volume of the anode may be calculated as disclosed in U.S. Patent Application Publication No. 2006/0068288 A1, published on Mar. 30, 2006.

The anode 24 advantageously employs a ratio of zinc weight (g) to anode volume ($cm^3$) less than 1.80 $g/cm^3$, according to one embodiment. The characteristic of the ratio of zinc weight (g) to anode volume ($cm^3$) is reduced as compared to conventional cells to provide enhanced cost efficiency. According to another embodiment, the ratio of zinc weight to anode volume is less than 1.7 $g/cm^3$. According to a further embodiment, the ratio of zinc weight to anode volume is less than 1.6 $g/cm^3$. The ratio of zinc weight to anode volume can be calculated by weighing the zinc (in grams) prior to mixing in the anode 24 and dividing by the volume (in cubic centimeters) of the anode 24 just prior to disposing the anode mix in the cell 10. The reduction in the ratio of zinc weight to anode volume is significant because less active materials are employed in a given cell and the efficiency of the electrochemically active material employed in the cell is enhanced. The reduction in the amount of zinc powder employed in the anode 24 thus results in enhanced cost efficiency which enables for the reduced cost manufacture of the battery cell 10 while not unduly limiting the performance of the cell 10.

The zinc powder employed in the anode 24 of the present invention may include BIA 115, commercially available from N.V. UMICORE, S.A. in Brussels, Belgium, according to one embodiment. The zinc is manufactured in a centrifugal atomization process as generally described in International Publication No. WO00/48260, which published on Aug. 17, 2000. The aforementioned publication discloses the composition of the zinc alloy and the manufacturing process used to produce the zinc powder. The zinc powder may have a number of physical and chemical characteristics, including a particle size characterized as having a $D_{50}$ median value less than 130 microns, or between 100 and 130 microns, or more specifically between 110 and 120 microns, according to some examples. Other characteristics of the zinc alloy are disclosed in U.S. Patent Application Publication No. 2006/0068288 A1 published on Mar. 30, 2006, the entire disclosure of which is hereby incorporated herein. In addition to the physical characteristics of the zinc described above, the zinc may include an alloy with bismuth and/or indium and/or aluminum incorporated therein. The quantity of bismuth may vary between 75 and 125 parts per million (ppm), according to one embodiment. According to a more specific embodiment, the quantity of indium is between 175 and 225 parts per million. The quantity of aluminum may be between 75 and 125 parts per million, according to one embodiment.

The electrochemical cell 10, as shown in FIG. 2, employs a cylindrical cathode 20 in a bobbin-type cell construction having an area of electrode interface between the anode 24 and the cathode 20 that is generally larger than a conventional cell for a given size cylindrical cell. The area of the electrode interface is defined as the area of the cathode tubular shaped interior surface which is calculated by multiplying the circumference of the inside diameter ID of the cathode 20 by the height H of the cathode 20 that is interfaced with the anode 24. According to one embodiment of the LR6 size battery, the area of the electrode interface is at least 11.5 $cm^2$ (1.78 $inches^2$). According to one specific example, the cathode 20 has an inside diameter ID of 0.942 cm (0.371 inch) and an interface height H of 4.252 cm (1.674 inches), resulting in an interface area of about 12.58 $cm^2$ (1.95 $inches^2$). In the example shown, the height H of the cathode 20 is multiplied by the circumference of the inside surface of the cathode 20 to provide the cathode interface area. The circumference of the interface side of the cathode having an inside diameter of 0.371 inch (0.942 cm) in a LR6 cell may be at least 1.2095 inches (3.0721 cm). More preferably, the inside diameter of the cathode is at least greater than 0.361 inch (0.917 cm). In one embodiment, the cathode 20 defines a single, tubular shaped cavity that is concentrically aligned with the opening in the steel can 12.

The inside diameter ID of the cathode 20 is 0.371 inch (0.942 cm), which is formed by using a rod-shaped ram having a circular cross section of a slightly larger outside diameter, such as 0.385 inch (0.978 cm) to impact mold the cathode mixture into the cylindrical shaped cathode 20, according to an impact molding embodiment. The cavity defined by the cathode 20 has an initial inside diameter ID that is equal to the outside diameter of the molding ram. However, due to physical characteristics of the cathode materials, the inside diameter of the cavity may slightly decrease (e.g., by the amount of 0.0014 inch or 0.0036 cm) soon after withdrawal of the molding ram.

The electrochemical cell 10 is formed having predetermined quantities of components employed in the anode 24, cathode 20 and alkaline electrolyte solution, according to the present invention. One example of the component quantities and ratios of materials employed in an exemplary LR6 AA-size electrochemical cell is illustrated in FIG. 3 showing the quantity of cathode components including anode, cathode, electrolyte and water and, ratios of component quantities within the electrochemical cell 10 per invention as compared to commercially available cells identified as cells A-D. The data presented in FIG. 3 includes actual quantities of materials disposed within the LR6 size electrochemical cell 10 according to one embodiment of the present invention as compared to actual quantities of materials employed in the four commercially available LR6 size cells A-D.

It should be appreciated that the quantities of component materials and the ratios of certain material quantities employed in a given battery cell may accurately be determined based on the actual amount of materials disposed within the battery cell, if the quantities of the ingredients employed during manufacturing are available. When the material quantities and ratios of materials employed in the given cell are not readily available, the quantity and ratios of materials employed in a given cell may be measured by employing a tear down measurement technique, as should be evident to those skilled in the art. The data presented in FIG. 4 illustrates the quantities and ratios of materials employed in an LR6 electrochemical cell according to an exemplary embodiment of the present invention compared to four commercially available LR6 cells E-H that were torn apart and measured for component quantities pursuant to a tear down measurement technique to acquire the cell make up data.

The data acquired from the tear down measurement technique may further be scaled to estimate the actual quantities of material and ratios employed in the measured cells. The data presented in FIG. 5 illustrates estimated quantities and ratios of materials calculated by scaling the measured data in FIG. 4 acquired from the tear down technique. The scaling includes comparing the measured tear down data of the battery cell according to the exemplary embodiment of the present invention shown in FIG. 4 with the actual data shown in FIG. 3 and computing a percentage difference. The percentage difference calculated for the exemplary battery cell according to the present invention is then used as a scaling factor to extrapolate estimated values from the tear down data in FIG. 4 to arrive at the estimated data shown in FIG. 5 for the commercially available cells E-H. For example, if the cell according to the present invention has measured data acquired from the tear down technique two percent less than the known actual amount for a certain component quantity, the commercially available cells E-H are scaled by the same two percent to arrive at the estimated scaled data.

The tear down data for a battery cell is determined by performing a tear down analysis and measurement technique, such as the exemplary analysis and measurement technique described herein, which provides for an estimate of the actual quantity of materials employed within a given cell. The accuracy of the estimated data may vary depending on the accuracy of the tear down analysis and measurement equipment and the steps performed. It should be appreciated that the tear down analysis and measurement technique is helpful for determining component quantities when the actual component quantities assembled into a given cell are not readily available.

One example of a tear down analysis and measurement procedure will now be described. The procedure may include analyzing one or more cells by disassembling each cell, removing the components contained within the cell container, and analyzing the individual components to determine the characteristics and quantities. This may include uncrimping the collector and seal assembly from the open end of the can and removing the assembly to expose the open end of the steel can. The anode, separator and cathode may be removed from within the can and analyzed.

The analysis may include any of a number of known techniques for analyzing the component make up of the materials within a battery cell. For example, a Gravimetric analysis may be made to determine the total water present within a given battery cell. This may include separating and weighing the anode and cathode portions of the battery cell, drying such anode and cathode portions in a vacuum at a temperature such as 130° C. for the anode and 200° C. for the cathode for a time period, such as 48 hours, and reweighing the components after drying. The total wet cathode weight may be determined based on the difference of the wet cathode in the can and the empty can itself, once the other components are removed.

An $HNO_3$ acid dissolution/leach technique may be employed to collect the potassium employed within a given cell, and the zinc from the anode and any zinc found in the separator. The dissolved solids are brought to a known volume and the solutions may be analyzed for potassium by flame atomic absorption. The solution may also be analyzed for zinc by EDTA potentiometric titrations. The total zinc per anode section and the total KOH per cell may be determined and a percent electrolyte per cell may also be calculated using known techniques. It should be appreciated that more than one cell may be analyzed to ensure the accuracy of the tear down analysis and measurement technique. Various techniques may be employed, all of which have an accuracy dependent upon the equipment and steps performed for a given technique.

As seen in FIG. 3, the LR6 cell according to the present invention has 3.66 grams of measured zinc within an anode consuming a volume of 2.30 cm$^3$. This results in a ratio of zinc weight to anode volume of 1.59 grams/cm$^3$. The ratio is less than 1.80 and more preferably less than 1.70 and yet more preferably less than 1.60.

According to another aspect of the present invention, the electrochemical cell 10 employs an overall amount of water disposed in the container that results in a weight ratio of water to zinc of greater than 0.65. According to a more specific embodiment, the weight ratio of water to zinc is at least 0.70. In the exemplary embodiment shown from the actual cell material data, the weight ratio of water to zinc is about 0.72.

According to a further aspect of the present invention, the electrochemical cell 10 has a weight ratio of water to manganese dioxide of greater than 0.28. According to a further embodiment, the weight ratio of water to the manganese dioxide is greater than 0.30. According to yet a further embodiment, the weight ratio of water to manganese dioxide is at least 0.32. In the example shown from the actual data, the ratio of water to manganese dioxide is 0.33.

Additionally, the electrochemical cell 10 of the present invention has a weight ratio of KOH to zinc that is greater than 0.35, according to one embodiment. According to another embodiment, the weight ratio of KOH to zinc is at least 0.40. The weight ratio of KOH to zinc includes all of the KOH employed within the electrolyte solution, anode 24, cathode 20 and separator 22. In the example shown, the weight ratio of KOH to zinc is 0.40.

The internal components of the electrochemical cell 10 of the present invention are selected to minimize the more expensive materials while minimizing performance loss, to result in a cost-efficient battery cell. In doing so, the cell 10 employs added electrolyte solution with water, and employs a smaller cathode 20 having less manganese dioxide and less zinc in the anode as compared to conventional cells. By employing a larger inside diameter ID of the cathode 20, the resulting smaller cathode employs less manganese dioxide (EMD) overall. In its place, a volumetric substitute of an inexpensive gel is used in place of the more expensive solid materials, thus maximizing the efficiency of the more expensive EMD materials. Additionally, the increased inside diameter of the cathode interface area reduces the current density to thus further improve efficiency.

The zinc concentration in the anode 24 is reduced, while the anode volume essentially is increased. The zinc capacity, as determined by the zinc concentration and anode volume, is designed to balance the anode to cathode (A/C) ratio capacities. The zinc powder contains sufficient electrical conductivity at low concentration.

The resulting ratio of water to manganese dioxide and the resulting ratio of water to zinc are higher than the ratios found in commercially available batteries. This results in higher efficiency for a 43 ohm four hours per day (radio) test. Cells constructed according to the present invention were discharged according to a radio service test as described below. As part of the same experiment, commercially available LR6 battery cells A-D were also evaluated pursuant to the radio service test. The various discharge efficiencies of the cathode employed in each of the cells according to the discharge test are illustrated in FIG. 3 under the heading Cathode Efficiency. As used herein, the discharge efficiency of the cathode is determined by dividing the cell ampere hour output by the manganese dioxide theoretical ampere hour input. The manganese dioxide input is calculated by multiplying the number of grams of manganese dioxide by 285 mAhr/g. The radio discharge test includes discharging the battery cell across a 43 ohm resistor for four hours per day and then allowing the cell to rest for the remaining twenty hours. The test is continued for consecutive days until the cell voltage falls below 0.9 volts. As seen in FIG. 3, when the cells of the present invention were discharged on the 43 ohm test, the discharge efficiencies for the cathode, based on the manganese dioxide's input is approximately 76.2 percent. In contrast, the best single cell discharge efficiency from the commercially available cells A-D was 75.5 percent. This test is based on 1.33 electrons (amp-hours) basis. This approach further enables product cost savings, while minimizing performance loss.

The electrochemical cell 10 of the present invention advantageously employs water, KOH, zinc and manganese dioxide in an amount to achieve a cost-efficient and good performance cell. The electrochemical cell 10 essentially operates on a reduced amount of electrochemically active material and as an enhanced quantity of water. This results in a lessened ratio of zinc weight to anode volume, enhanced weight ratio of water to zinc, and an enhanced weight ratio of water to manganese dioxide. Additionally, in an enhanced weight ratio of KOH to zinc is also achieved.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
a container defining a sealed volume;
a cathode disposed within the container and comprising manganese dioxide;
an anode disposed within the container and comprising zinc, wherein a ratio of zinc weight to anode volume in the container is less than 1.80 g/cm$^3$, wherein the anode is the only anode present in the container;
an alkaline electrolyte disposed within the container in contact with the anode and cathode; and
water disposed within the container, wherein a weight ratio of the water to the total manganese dioxide is greater than 0.28.

2. The electrochemical cell as defined in claim 1, wherein the weight ratio of water to manganese dioxide is greater than 0.30.

3. The electrochemical cell as defined in claim 1, wherein the weight ratio of water to manganese dioxide is at least 0.32.

4. The electrochemical cell as defined in claim 1, wherein a weight ratio of water to zinc is greater than 0.65.

5. The electrochemical cell as defined in claim 1, wherein the weight ratio of water to zinc is at least 0.70.

6. The electrochemical cell as defined in claim 1, wherein the manganese dioxide is electrolytic manganese dioxide.

7. The electrochemical cell as defined in claim 1, wherein the container comprises a substantially cylindrical container having an open end sealed closed by a cover and seal member.

8. The electrochemical cell as defined in claim 1, wherein the alkaline electrolyte comprises potassium hydroxide (KOH).

9. The electrochemical cell as defined in claim 8, wherein a weight ratio of KOH to manganese dioxide is greater than 0.16.

10. The electrochemical cell as defined in claim 8, wherein a weight ratio of KOH to manganese dioxide is at least 0.18.

11. The electrochemical cell as defined in claim 8, wherein a weight ratio of KOH to zinc is greater than 0.35.

12. The electrochemical cell as defined in claim 11, wherein the weight ratio of KOH to zinc is at least 0.40.

13. The electrochemical cell as defined in claim 1, wherein the ratio of zinc weight to anode volume is less than 1.70 g/cm$^3$.

14. The electrochemical cell as defined in claim 1, wherein the ratio of zinc weight to anode volume is less than 1.60 g/cm$^3$.

15. The electrochemical cell as defined in claim 1, wherein the cell is a cylindrical AA-size cell, wherein the cathode is formed having an inside diameter greater than 0.360 inch.

16. The electrochemical cell as defined in claim 15, wherein the cathode has an inside diameter greater than 0.365 inch.

17. The electrochemical cell as defined in claim 16, wherein the inside diameter of the cathode is approximately 0.371 inch.

18. An electrochemical cell comprising:
a container defining a sealed volume;
a cathode disposed within the container and comprising manganese dioxide;
an anode disposed within the container and comprising zinc, wherein a ratio of zinc weight to anode volume is less than 1.80 g/cm$^3$, wherein the anode is the only anode present in the container;
an alkaline electrolyte disposed within the container in contact with the anode and cathode; and
water disposed within the container, wherein a weight ratio of water to zinc is greater than 0.65, and wherein a weight ratio of water to total manganese dioxide is greater than 0.28.

19. The electrochemical cell as defined in claim 18, wherein the weight ratio of water to zinc is at least 0.70.

20. The electrochemical cell as defined in claim 18, wherein the weight ratio of water to manganese dioxide is greater than 0.30.

21. The electrochemical cell as defined in claim 18, wherein the weight ratio of water to manganese dioxide is at least 0.32.

22. The electrochemical cell as defined in claim 18, wherein the manganese dioxide is electrolytic manganese dioxide.

23. The electrochemical cell as defined in claim 18, wherein the alkaline electrolyte comprises potassium hydroxide (KOH).

24. The electrochemical cell as defined in claim 23, wherein a weight ratio of potassium hydroxide to zinc is greater than 0.35.

25. The electrochemical cell as defined in claim 23, wherein a weight ratio of potassium hydroxide to zinc is at least 0.40.

26. The electrochemical cell as defined in claim 23, wherein the weight ratio of KOH to manganese dioxide is greater than 0.15.

27. The electrochemical cell as defined in claim 23, wherein the weight ratio of KOH to manganese dioxide is at least 0.18.

28. The electrochemical cell as defined in claim 18, wherein the container comprises a cylindrical container having an open end sealed closed by a seal member.

29. The electrochemical cell as defined in claim 18, wherein the cell is a cylindrical AA-size cell, wherein the cathode is formed having an inside diameter greater than 0.360 inch.

30. The electrochemical cell as defined in claim 29, wherein the cathode has an inside diameter greater than 0.365 inch.

31. The electrochemical cell as defined in claim 30, wherein the inside diameter of the cathode is approximately 0.371 inch.

32. An electrochemical cell comprising:
a container defining a sealed volume;
a cathode disposed within the container and comprising manganese dioxide;
an anode disposed within the container and comprising zinc, wherein a ratio of zinc weight to anode volume is less than 1.80 g/cm$^3$, wherein the anode is the only anode present in the container;
water disposed within the container, wherein a weight ratio of the water to total manganese dioxide is greater than 0.28; and
an alkaline electrolyte disposed within the container in contact with the anode and cathode.

33. The electrochemical cell as defined in claim 32, wherein the ratio of zinc weight to anode volume is less than 1.7 g/cm$^3$.

34. The electrochemical cell as defined in claim 32, wherein the ratio of zinc weight to anode volume is less than 1.60 g/cm$^3$.

35. The electrochemical cell as defined in claim 32, wherein a weight ratio of the water to the zinc is greater than 0.65.

36. The electrochemical cell as defined in claim 35, wherein the weight ratio of water to zinc is at least 0.70.

37. The electrochemical cell as defined in claim 32, wherein the weight ratio of water to manganese dioxide is greater than 0.30.

38. The electrochemical cell as defined in claim 37, wherein the weight ratio of water to manganese dioxide is at least 0.32.

39. The electrochemical cell as defined in claim 31, wherein the cell is a cylindrical AA-size cell, wherein the cathode is formed having an inside diameter greater than 0.360 inch.

40. The electrochemical cell as defined in claim 39, wherein the cathode has an inside diameter greater than 0.365 inch.

41. The electrochemical cell as defined in claim 40, wherein the inside diameter of the cathode is approximately 0.371 inch.

42. The electrochemical cell as defined in claim 32, wherein the alkaline electrolyte comprises potassium hydroxide (KOH), and wherein a weight ratio of KOH to zinc is greater than 0.35.

\* \* \* \* \*